United States Patent [19]

Edwards

[11] 4,218,204
[45] Aug. 19, 1980

[54] LABELLING

[75] Inventor: Frederick H. Edwards, Mentone, Australia

[73] Assignee: Vinyl Clad Proprietary Limited, Victoria, Australia

[21] Appl. No.: 4,553

[22] Filed: Jan. 18, 1979

[30] Foreign Application Priority Data

Jan. 19, 1978 [AU] Australia .................. PD3070

[51] Int. Cl.² .............................................. B29F 1/00
[52] U.S. Cl. .................. 425/129 R; 425/128; 425/185; 425/190
[58] Field of Search ............... 425/128, 129 R, 129 S, 425/185, 190

[56] References Cited

U.S. PATENT DOCUMENTS

| 3,463,845 | 8/1969 | DePass et al. | 425/129 R X |
| 3,555,609 | 1/1971 | Chu et al. | 425/129 S X |
| 3,557,406 | 1/1971 | Stransfeld | 425/129 R X |
| 3,826,600 | 7/1974 | Hutton et al. | 425/129 R X |

FOREIGN PATENT DOCUMENTS 24136 11/1970 Australia .
30712 10/1975 Australia .

Primary Examiner—J. Howard Flint, Jr.
Attorney, Agent, or Firm—Learman & McCulloch

[57] ABSTRACT

An attachment for an injection moulding machine which enables simple in mould labelling to be carried out. A moveable die face receives the label and the product is moulded onto the label. The moveable die face may be part of a rotary core attachment or a reciprocal sliding attachment to the injection die. The label is held onto the face of the die by electrostatic forces. Labels are applied to the moveable die face prior to its moving into alignment with the die and commencement of the moulding operation.

4 Claims, 4 Drawing Figures

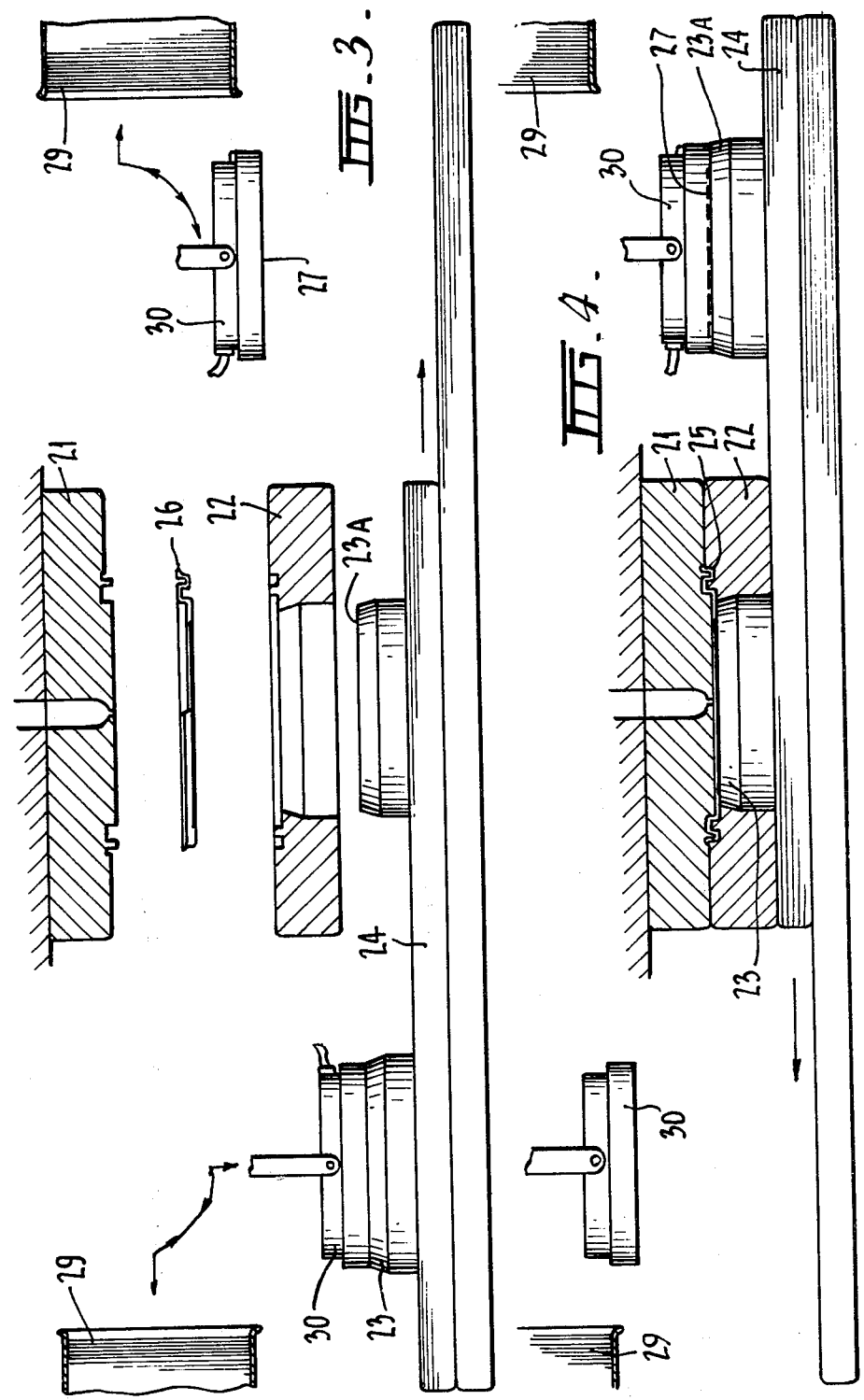

LABELLING

This invention relates to the labelling of moulded products, particularly injection moulded plastic products.

The time and labour content involved in applying labels to moulded plastic products subsequent to the moulding step is quite high. It has been proposed previously to insert labels into the mould and then to inject the plastic and mould the product onto the label. Australian Pat. No. 274,565 relates to a method of inserting a film into a mould cavity and injecting a molten thermoplastic into the cavity whereby the film which contains printed matter is fused to the moulded product.

Australian Pat. Nos. 448,053 and 430,449 relate to mould labelling where the label is applied to a blow moulded product during the blow moulding operation. The label applicator moves the label toward and onto the expanding blow moulded product. The apparatus of these patents is not particularly suitable or practical for injection moulding.

Australian Patent Specification No. 44776/68 describes an apparatus for placing a label into a mould cavity during the sequence of mould operations when the mould parts are open. An apparatus of this kind requires precise sequential movements of the label inserting arm and the mould parts otherwise serious damage to the mould and the label inserting equipment can occur. Further, the moulding time for each product tends to be lengthened and this reduces output volumes for the moulding machines.

It is an object of this invention to provide means for label application during the moulding operation which overcomes some of the short comings of the prior art.

To this end, the present invention provides in an injection moulding machine, the improvement comprising a movable mould part having a plurality of faces adapted to receive and retain a label, said movable mould part being movable from a position in which a label is placed onto one of said plurality of faces to a position where said one face forms part of a wall of the mould cavity of said injection moulding machine. Preferably, the movable mould part may either be rotatable or reciprocal. The movement of the movable mould part is preferably timed to occur in sequence with the opening sequence of the mould during which the moulded product is released.

The label preferably has its printed surface against the movable mould face so that the injected plastic covers the reverse surface of the mould. Although it is not preferred, the injection of the plastic can be from the movable mould face through a central hole in the label and into the mould cavity.

There will now be described two preferred embodiments of the present invention.

FIG. 3 is a sectional view of a second embodiment of the invention, wherein the die elements are shown apart; and FIG. 4 is a similar view to FIG. 3 showing the die elements together.

Figure 1:
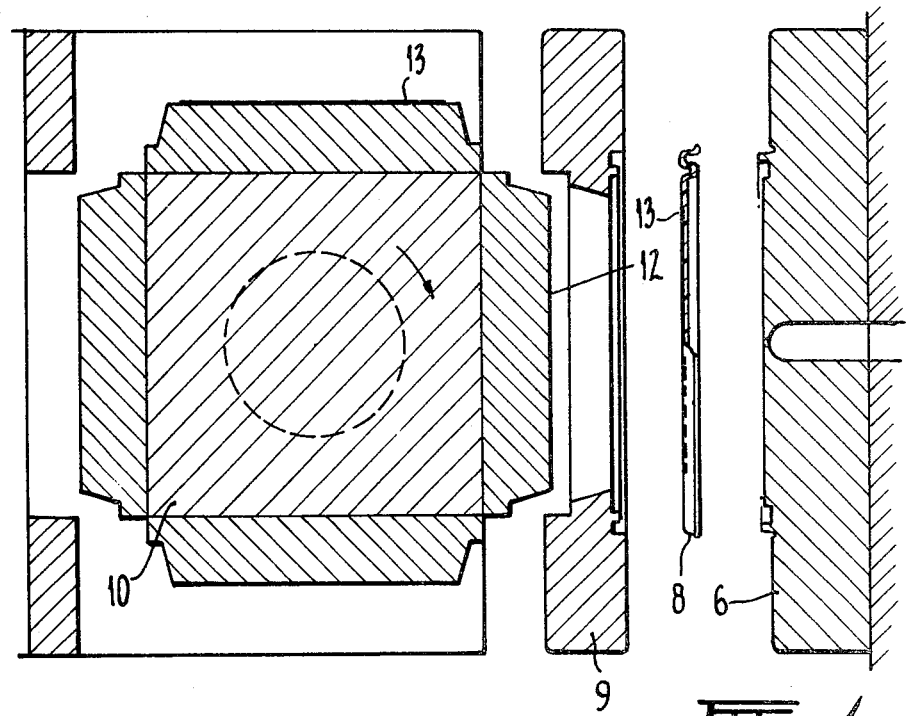
FIG. 1 is a sectional view of one embodiment of this invention wherein the die elements are separated.
Figure 2:
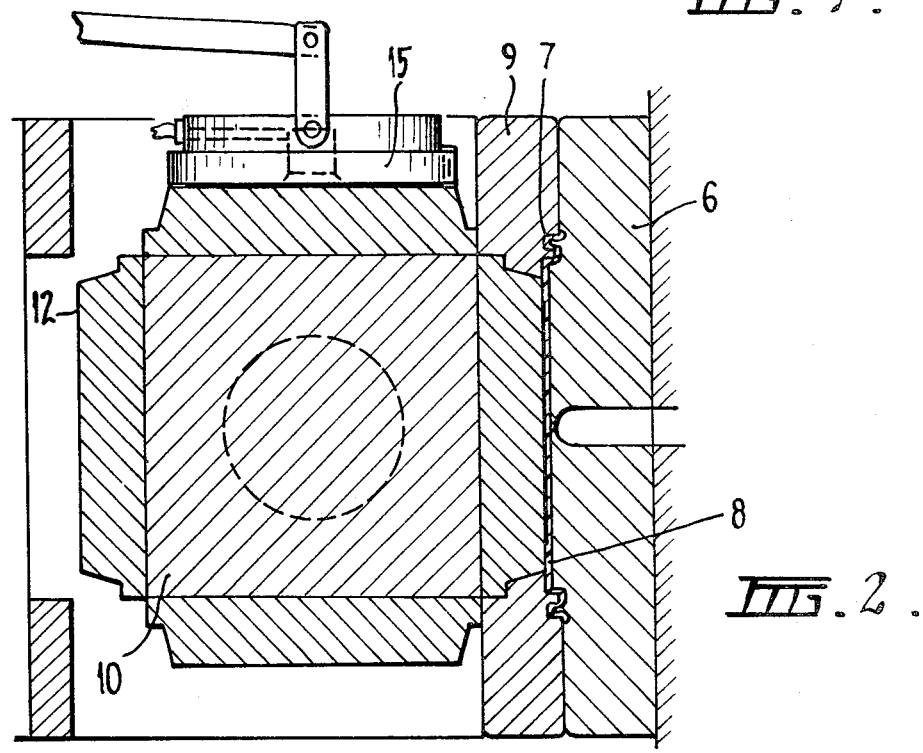
FIG. 2 is a similar sectional view to FIG. 1, wherein the die elements are in their closed position.

Referring now to FIGS. 1 and 2, the assembly is connected to an injection moulding machine (not shown) which extends behind die plate 6. The die cavity 7 is in the form of a container lid, which lid 8 is shown in FIG. 1. The die itself is composed of die plate 6 which is attached to the injection moulding machine, die plate 9 and rotary core 10. The rotary core 10 has four faces 12 which form a section of the die wall and which are adapted to carry a label 13 which is applied to the surface of lid 8.

FIG. 2 shows the label applicator 15 in position on a face 12 of the rotary core 10 transferring a label 13 to the face during the injection step of the moulding operation. Any suitable form of label applicator can be used. Ideally, the sequence of movements of the label applicator are dictated by the movements of the die elements or the timing of the injection machine.

The sequence of steps are:

(1) Label in closed die cavity and injection of thermoplastic is taking place while at same time label applicator places label onto the next successive rotary face.

(2) Die plates 6 and 9 move apart subsequent to label applicator 15 moving away from the face of rotary core 10. The initial movement away of label applicator 15 ensures that it is well clear of the face of the rotary core 10.

(3) Rotary core 10 rotates 90° to move the label 13 arcuately and laterally into alignment with die plates 6 and 9 in the open die position. During this movement, label applicator 15 moves adjacent the label hopper to pick up another label.

(4) The die plates 6 and 9 come together with rotary core 10 and label applicator 15 moves back to contact the next successive face 12 of rotary core 10.

The sequence then continues.

To ensure that the sequence of operations is correctly followed, the movement of the rotary core is actuated by the opening and closing of the die plates and the movement of the die plates also actuates the sequential movements of the label applicator.

The second embodiment of this invention is illustrated in FIGS. 3 and 4.

The injection moulding machine (not shown) is attached to die plate 21 which with die plate 22 and the die faces 23 and 23A of sliding core 24 forms the die cavity 25. The die cavity 25 is once again used for the formation of a container lid 26 and the label 27 is applied to the lid from die faces 23 and 23A.

The sliding core 24 reciprocates between a first position as shown in FIG. 3 and a second position as shown in FIG. 4. Two label applicators 30 can be used to apply labels from the hoppers 29 to die faces 23 and 23A of the two die parts on the sliding core 24.

The sequence of operating steps for the embodiment of FIGS. 3 and 4 are:

(1) The label is in the closed die cavity 25 and injection of thermoplastic is completed when the first label applicator 30 (shown in FIG. 4) transfers a label to face 23A of the second die face of sliding core 24. The transfer of the label is achieved by forming an electrostatic charge on the label as in the previously described embodiment.

(2) Die plates 21 and 22 move apart and away from sliding core 24 and the label applicator moves laterally away from die face 23A.

(3) Sliding core 24 then moves laterally to bring face 23A with the label 27 into alignment with die plates 21 and 22. Simultaneously, the label applicator (not shown) for the die face 23 of sliding core 24, picks up a label in readiness for face 23, which has moved into position for receiving a label.

(4) Die plates 21 and 22 close with the die face 23A carrying the label to commence the next injection moulding sequence while the other die face 23 of sliding core 24 receives a label.

As with the first embodiment, the movement of sliding core 24 is actuated by the injection and separation sequences of the injection moulding machine and these movements similarly actuate the movement of the label applicator.

In both embodiments, the label can easily be introduced into the die cavity without slowing down the injection moulding sequence or increasing the probability of damage to the die. Because the label applicator does not enter the die cavity, there is less likelihood of accidents occurring.

I claim: The claims defining the invention are as follows:

1. In an injection moulding machine, the improvement comprising a movable mould part having a plurality of faces adapted to receive and retain a label, said movable mould part being laterally movable from a labeling position in which a label is placed onto one of said plurality of faces to a moulding position where said one face forms part of a wall of the mould cavity of said injection moulding machine.

2. The improvement of claim 1, in which the movable mould part is rotatable about an axis parallel to the opposite wall of the injection moulding machine.

3. The improvement of claim 1, wherein the movable mould part reciprocates linearly moving successive faces from the labelling position to said moulding position and back to said labelling position.

4. An injection moulding die comprising a first mould part through which synthetic plastic material can be injected and a second movable mould part, the die cavity being formed when the first and second mould parts are abutting, said second movable mould part having a plurality of faces adapted to receive and retain a label, said movable mould part being movable laterally from a position wherein a label can be placed onto one of said plurality of faces to a position where it abuts said first mould part to form said die cavity.

* * * * *